May 23, 1950     H. A. McARTHUR ET AL     2,508,960
MILKING MACHINE

Filed Jan. 18, 1943     3 Sheets-Sheet 1

Inventors:
Herbert A. McArthur
and John B. Decker,
By Banning & Banning
Attorneys.

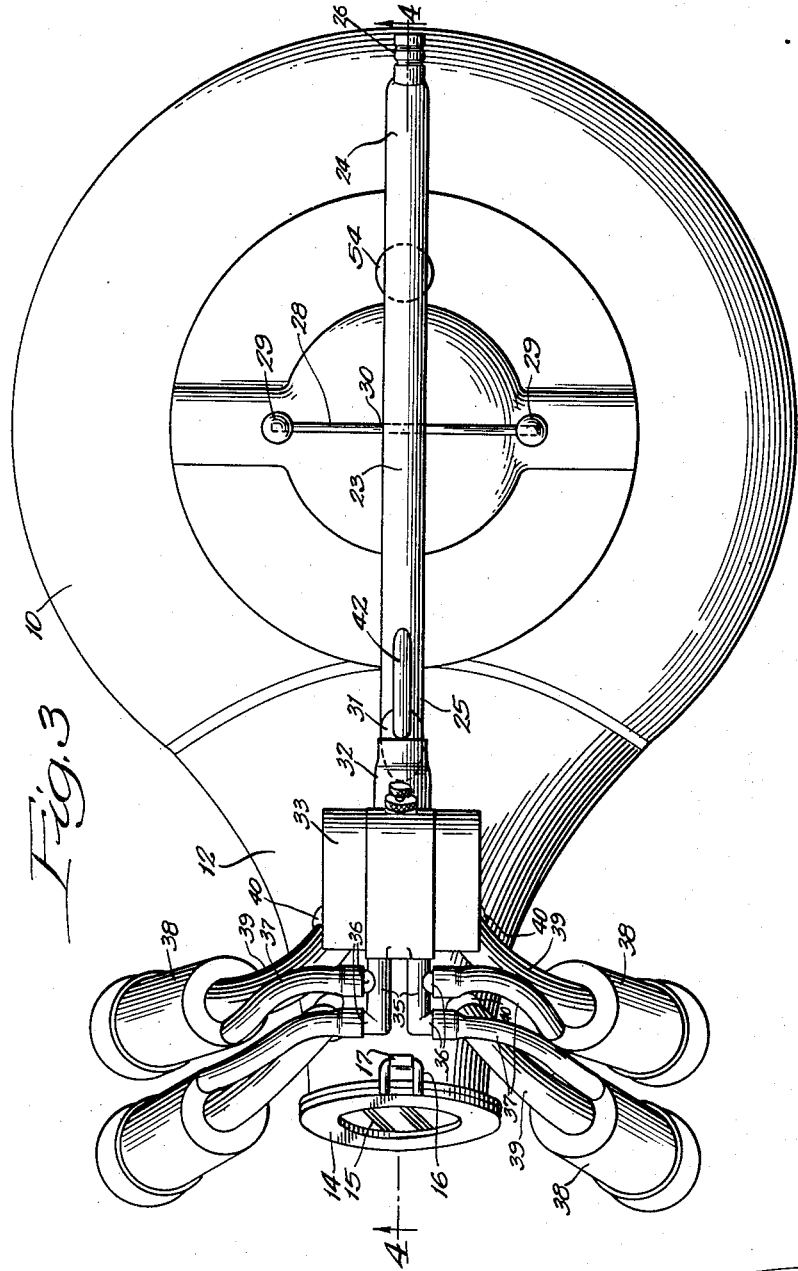

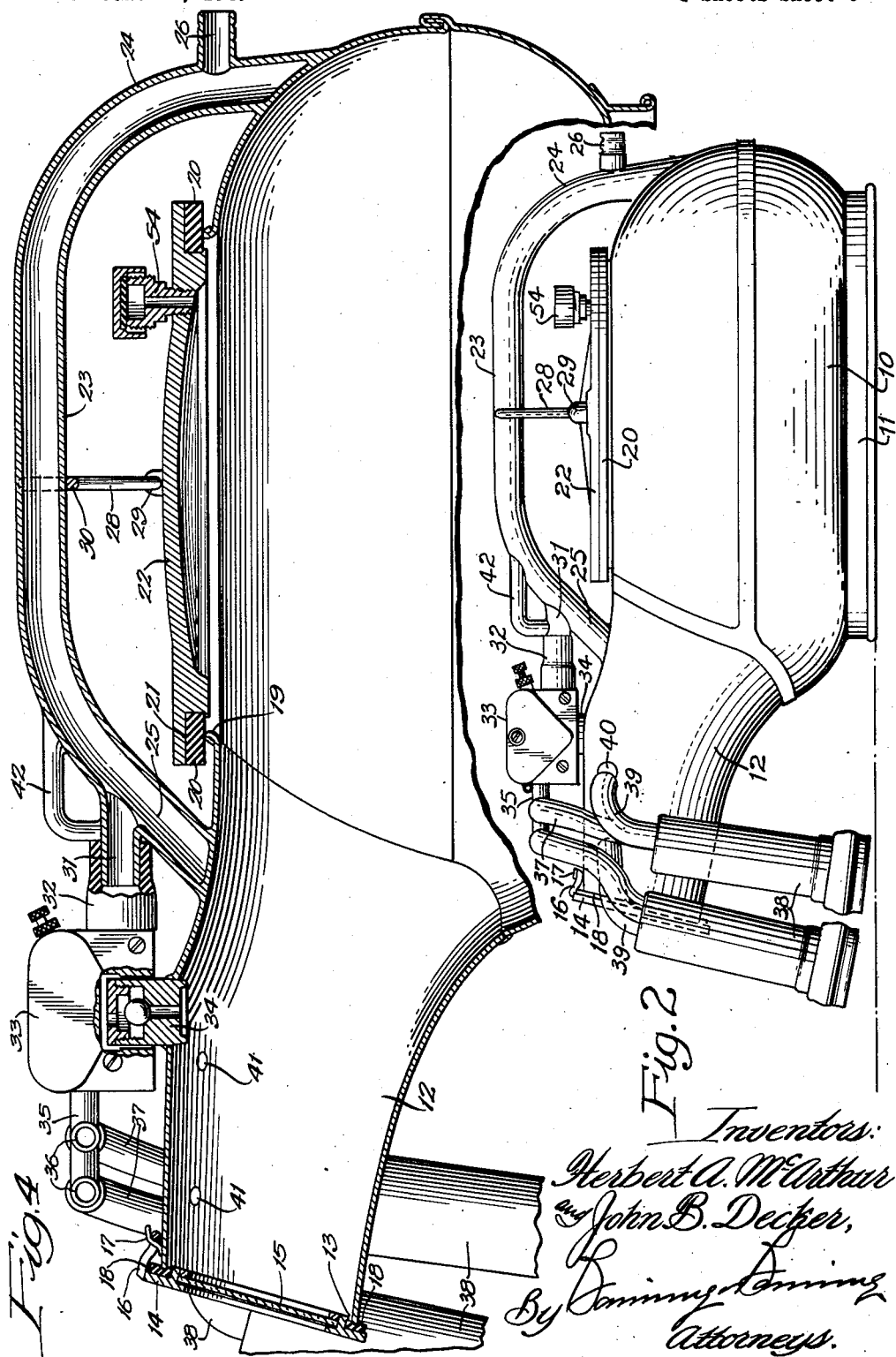

Patented May 23, 1950

2,508,960

UNITED STATES PATENT OFFICE 2,508,960

MILKING MACHINE

Herbert A. McArthur, Libertyville, and John B. Decker, Evanston, Ill., assignors, by mesne assignments, to Rite-Way Products Company, Chicago, Ill., a corporation of Delaware Application January 18, 1943, Serial No. 472,702

11 Claims. (Cl. 31—58)

The milking machine of the present invention is of the suspended type which is hung from the body of the cow in position to apply the teat cups to the teats of the cow, and there held in position during the milking operation without subjecting the teats to an oscillating or surging action which is characteristic of certain types of milking apparatus with which we are familiar.

With this end in view, it is desirable to secure the teat cups to a spout or rearward elongation of the milking receptacle in position to stand in substantially vertical relation to the teats so that during the pulsations of the milker, the teats will not be drawn obliquely forward or materially displaced from their normal pendant position. To attain this result it is necessary that provision be made for a spaced two-point suspension of the milking receptacle so that it can not swing or oscillate during the milking operation, and this necessitates the use of a harness or surcingle of special formation which constitutes one of the more important features of the present invention.

The invention furthermore relates to a special or unique form of handle which serves the multiple function of affording a duct for the exhausting of air from the receptacle and recurrently from the teat cups, and which furthermore serves to afford the required two-point suspension and to retain the cap or cover in sealing relation to the body of the receptacle.

The invention is furthermore directed to the formation of the spout and the arrangement of the teat cups and pulsator with relation thereto and to the provision of a spout closure which during the milking operation serves to seal the spout and also to afford a window or sight glass conveniently located to permit inspection of the interior of the receptacle during the milking operation.

Further objects and details will appear from the accompanying drawings of the invention, wherein:

Fig. 2 is a side elevation of the milker on a larger scale;

Fig. 3 is an enlarged plan view thereof; and

Fig. 4 is an enlarged sectional elevation taken on the line 4—4 of Fig. 3 and with the bottom broken away.

Figure 1:
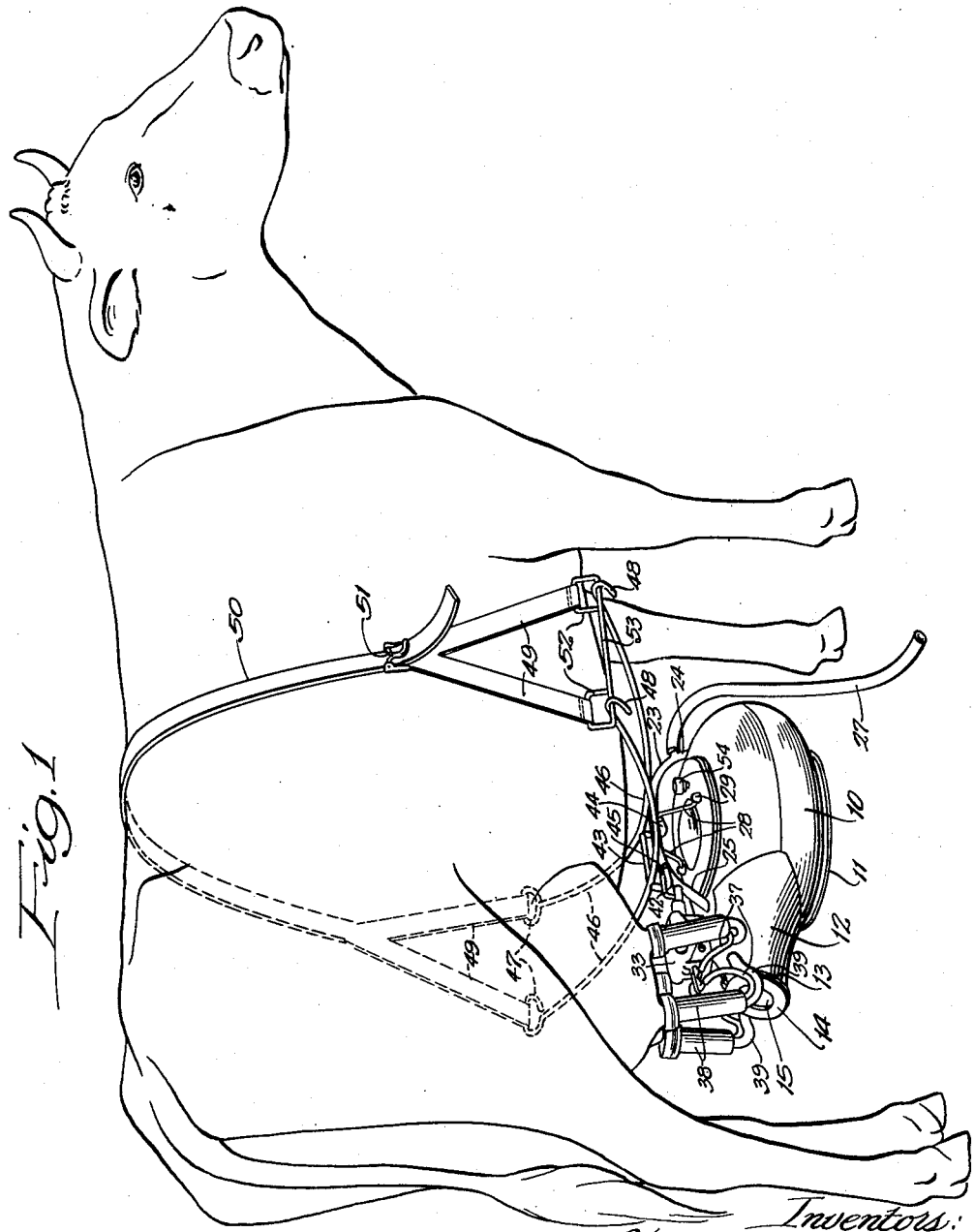
Figure 1 is a perspective view of the milker of the present invention secured to the body of a cow.

The invention comprises a milk receptacle 10 which preferably is of flattened globular form having a base flange 11 which affords a firm rest when the receptacle is supported upon the floor. The main body of the receptacle communicates with a rearward extension or spout 12, terminating in a mouth 13 having its rim standing in oblique relation and affording contact for a circular sealing cap 14 having in its center a transparent window or sight glass 15 to permit inspection of the interior. The cap is provided at its upper edge with a forwardly extending loop 16 which is adapted to engage a hook 17 on the upper wall of the spout which serves to hold the cap in place but permits its ready release and removal for the discharge of the milk as occasion may require.

The cap is provided with a ring-shaped gasket 18 which abuts against the rim of the spout so that when a vacuum is established within the receptacle the cap will be held tightly sealed thereon.

The top of the receptacle is provided with a circular aperture 19, the rim of which bears against a ring-shaped gasket 20 socketed within a recess 21 in the rim of a cover 22 which fits over the top of the receptacle and serves to seal the same when the air is exhausted from the interior.

Above the cover extends an arch-shaped tubular handle 23, the forward end 24 of which is down-turned and united by brazing, welding, or otherwise to the rounded forward wall of the receptacle while the rear end 25 of the handle extends obliquely downward and makes connection with the forward or neck portion of the spout at a point slightly to the rear of its line of juncture with the body of the receptacle.

The forward portion of the handle has formed thereon a nipple 26 which affords a connection for a suitable exhaust pipe 27 adapted to maintain a vacuum within the receptacle. The cover 22 is provided in its center with a bail 28 having its ends socketed within lugs 29 and having its center inwardly recurved as at 30 to embrace and bear against the under side of the handle so that when the bail is swung upwardly as in Fig. 4, it will exert a downward thrust against the cover to hold the same against displacement when the vacuum is released from the interior or when the receptacle is being transported by hand.

The handle near its rear end, at a point above its terminus, is provided with a rear nipple 31 which is adapted to engage with a nipple 32 of rubber or the like projecting forwardly from a pulsator 33 which is mounted upon the spout at a point midway between the body of the receptacle and the terminus of the spout. The pulsator is of conventional form and construction and need not be described in detail. Suffice it to say that it communicates with the interior of the spout through a valve plug 34 upon which the pulsator is supported. The casing of the pulsator is provided with two rearwardly extending header tubes 35 each of which is provided with a pair of laterally disposed nipples 36 which afford points of connection for rubber vacuum tubes 37, two on each side, which lead to the respective teat cups 38.

The teat cups are of conventional form and of a character well understood in the art, so that a detailed description thereof is unnecessary. Each of the teat cups has leading from its upper end a rubber milk duct 39 which is fitted onto a nipple 40 projecting outwardly from the spout on the upper side thereof and communicating with the interior of the spout through a port 41.

The milk ducts and vacuum tubes in unison afford flexible supports for the four teat cups which when the milk receptacle is supported upon the floor will hang downwardly as in Fig. 2 without, however, making contact with the floor so that defiling or contamination of the teat cups is prevented. When the teat cups are swung upwardly to engage the teats of the cow, they will extend in a substantially vertical direction conforming to the normal position of the teats so that, in operation, the milking action will be due almost entirely to the pulsations afforded within the teat cups with but slight tension occasioned by the weight of the teat cups or the spout of the milk receptacle which carries the same although the normal breathing of the cow will occasion an up and down movement which may supplement the action of the teat cups in some degree.

In order to maintain the milk receptacle and the teat cups in substantially stable position, and to prevent tilting or displacement of the milk receptacle away from its normal pendant position, the following means are provided:

The handle, at the point where it bends downwardly toward its rear end, is provided with an angular loop 42, the upper end of which makes direct connection with the bend of the handle and the lower end with the nipple 31, which loop affords a rear point of connection for a longitudinally extending bridge rod 43 having its ends down-turned and reversely bent to provide front and rear hooks 44 and 45 which respectively engage the loop 42 and the handle 23. The engagement with the handle is at a point near the center thereof while the engagement with the loop affords suspension near the base of the spout so that these two suspension points, in unison, serve to provide support at a point substantially coincident with the center of weight, with the result that the milk receptacle, when suspended from the cow, will maintain its normal horizontal position and will not be subjected to any fore and aft swinging or oscillating movement during the milking operation, so that the teat cups will maintain a substantially uniform relation to the teats and the latter will be relieved from excessive drag or forward tension occasioned by oscillating movements or by the accumulation of milk within the receptacle.

The bridge rod 43 extends between spaced frame rods 46 which are bowed to underlie the belly of the cow at a point slightly in advance of the udder and normally slightly out of contact with the belly. The frame rods at their rear ends, as viewed from the right side of the cow in Fig. 1, are each provided with a loop 47 while the forward ends are provided with hooks 48. The frame rods are suspended at each end from downwardly diverging suspender straps 49 which unite at their upper ends and are connected with a single strap or surcingle 50 which arches over the back of the cow near the center thereof.

The forward end of the surcingle is engaged by a buckle 51 which enables the tension to be adjusted to the required degree to conform to the configuration of the cow and to regulate the height at which the milk receptacle is to be maintained although in most cases it is desirable to draw up the surcingle sufficiently to hold the frame rods in relatively close proximity to the cow's belly, it being understood that as the milk accumulates in the receptacle the weight will increase so that there will be a tendency for the milk receptacle to lower somewhat.

The front suspender straps engage the looped ends 52 of a suspending bar 53 through which the hooks 48 will be engaged, which arrangement affords a rigid under-frame from which the milk receptacle is hung and permits the easy and convenient connecting and disconnecting of the apparatus as occasion may require.

In order to break the vacuum within the milk receptacle, a release valve 54 is provided in the cover 22 so that the vacuum can be broken before the teat cups are withdrawn from the teats of the cow.

Operation

In operation, the harness may be easily and conveniently fitted to the cow by first throwing the surcingle over the cow's back which allows the frame comprising the frame rods and bridge rod to hang down on the far side of the cow but within easy reach of the operator, thereby permitting the hooked ends to be lifted into position to engage with the suspender bar 53. If necessary, the surcingle can then be adjusted to the desired degree after which the empty milk receptacle will be lifted and hooked onto the hooks 44 and 45 which occupy a center position with respect to the frame rods.

The teat cups will then be applied to the teats of the cow and the vacuum connection established through the tube 27 which starts the pulsations in the pulsator after which the milking will proceed in a manner well understood in the art.

The position of the obliquely disposed sight glass 15 in the closing cap at the end of the spout permits the operator from time to time to inspect the interior of the milk receptacle to ascertain the progress of the milking and to determine whether or not all of the teat cups are operating satisfactorily.

As before-stated the milk receptacle will be held against any fore and aft oscillating movement but the normal breathing of the cow will occasion a slight up and down movement of the milk receptacle which may at times coincide with the pulsating periods and thus afford an added pull on the teats, but this will be in a substantially vertical direction and is in no sense to be confused with a fore and aft swinging or oscillating movement sometimes referred to as a surging movement which in certain types of milkers is mechanically effected through means provided for that purpose and which requires that the milk receptacle be hung from a single point of suspension in order to permit such mechanical oscillation. The provision of a rearwardly extending spout, not only permits the milk receptacle to be hung at a point immediately below the belly of the cow, but enables the teat cups to be vertically positioned from a point immediately beneath the teats so that they will not exert a forward draw or drag on the teats but will maintain a substantially uniform position throughout the milking operation.

The provision of a spout, moreover, affords a convenient means for the discharge of the milk and brings the sight glass 15 into a convenient line of vision with the operator's eye.

After the milking operation has been completed, and before the teat cups are withdrawn from the teats, the vacuum will be broken by opening the release valve 54 which permits the teat cups to be easily withdrawn without adhesion to the teats. The utilization of a tubular handle as the vacuum duct enables the vacuum pipe line to make connection with the apparatus at a convenient point and at the same time the handle affords the basis for a two-point suspension which is necessary in a device intended to operate in a manner conformable to the principles of the present invention.

We claim:

1. In a milking machine the combination of a milk receptacle provided with a rearwardly extending spout adapted to underlie the udder of a cow, a pulsator mounted in fixed relation to the milk receptacle, a plurality of teat cups, flexible tube connections between the pulsator and the respective teat cups, flexible milk ducts establishing connection between the respective teat cups and the interior of the milk receptacle, a surcingle adapted to be arched over the back of a cow and terminating on each side in forked ends, an elongated frame adapted to extend transversely beneath the belly of a cow and including two interconnected members pivoted respectively to the forked end of the surcingle on one side of the cow and adapted to be releasably connected to the forked end of the surcingle on the other side of the cow and longitudinally spaced connecting means between the frame and the milk receptacle for holding the milk receptacle against longitudinal oscillation with relation to the frame.

2. In a milking machine the combination of a milk receptacle provided with a rearwardly extending spout adapted to underlie the udder of a cow, a pulsator mounted on the spout, a plurality of teat cups, flexible tube connections between the pulsator and the respective teat cups, flexible milk ducts establishing connection between the respective teat cups and the interior of the milk receptacle, the pulsator and teat cups with their connections being adapted to permit the teat cups to fit vertically onto the teats while hanging in normally pendant position, a surcingle adapted to be arched over the back of a cow and terminating on each side in forked ends, an elongated frame adapted to extend transversely beneath the belly of a cow and including two interconnected members pivoted respectively to the forked end of the surcingle on one side of the cow and adapted to be releasably connected to the forked end of the surcingle on the other side of the cow and longitudinally spaced connecting means between the frame and the milk receptacle for holding the milk receptacle against longitudinal oscillation with relation to the frame.

3. In a milking machine the combination of a milk receptacle provided with a rearwardly extending spout adapted to underlie the udder of a cow, a pulsator mounted on the spout, a plurality of teat cups, flexible tube connections between the pulsator and the respective teat cups, flexible milk ducts establishing connection between the respective teat cups and the interior of the milk receptacle, a surcingle adapted to be arched over the back of a cow and terminating on each side in forked ends, an elongated frame adapted to extend transversely beneath the belly of a cow and having its ends pivoted at longitudinally spaced points on the forked ends of the surcingle on one side of a cow, an arched handle extending longitudinally of the milk receptacle, and longitudinally spaced hooks affording engagement between the frame and the handle to hold the milk receptacle against longitudinal oscillation with relation to the frame.

4. In a milking machine the combination of a milk receptacle provided with a rearwardly extending spout adapted to underlie the udder of a cow, a pulsator mounted on the spout, a plurality of teat cups, flexible tube connections between the pulsator and the respective teat cups, flexible milk ducts establishing connection between the respective teat cups and the interior of the milk receptacle, the pulsator and teat cups with their connections being adapted to permit the teat cups to fit vertically onto the teats while hanging in normally pendant position, a surcingle adapted to be arched over the back of a cow and terminating in forked ends, an elongated frame adapted to extend transversely beneath the belly of a cow and having its ends engaged with the forked ends of the surcingle, an arched handle extending longitudinally of the milk receptacle, and longitudinally spaced hooks affording engagement between the frame and the handle to hold the milk receptacle against longitudinal oscillation with relation to the frame.

5. In a milking machine the combination of a milk receptacle provided with a rearwardly extending spout, a pulsator mounted on the spout, a plurality of teat cups, flexible tube connections between the pulsator and the respective teat cups, flexible milk ducts establishing connection between the respective teat cups and the interior of the milk receptacle, an arched tubular handle extending longitudinally of the milk receptacle and having its forward and rear ends secured thereto, a connection between the handle and a vacuum line and a connection between the handle and the pulsator for establishing vacuum conditions through the handle, a top sealing cover for the milk receptacle, and a bail pivoted at its ends to the cover and adapted to be swung upwardly to engage the handle and exert a downward thrust on the cover to hold the same closed.

6. In a milking machine the combination of a milk receptacle, a pulsator carried thereby, a plurality of teat cups, flexible tube connections between the pulsator and the respective teat cups, flexible milk ducts establishing connection between the respective teat cups and the interior of the milk receptacle, an arched rigid handle extending longitudinally of the milk receptacle and having its ends secured thereto, suspending means adapted to be arched over the back of a cow and provided with devices for engagement with the handle at longitudinally spaced points thereon to prevent longitudinal oscillation of the milk receptacle with relation to said suspending means, the handle being tubular and provided near its forward end with means for connection with a vacuum line and being provided near its rear end with a vacuum connection with the pulsator.

7. In a milking machine the combination of a milk receptacle provided with a rearwardly extending spout open at its rear end for the discharge of milk and having a sealing cap sealing the open end of the spout, a pulsator mounted on the spout, a plurality of teat cups, flexible tube connections between the pulsator and the respective teat cups, flexible milk ducts leading from the respective teat cups to the spout, an arched tubular handle extending longitudinally of the milk receptacle and having its forward and rear ends secured thereto, a connection between the handle and a vacuum line and a connection between the handle and the pulsator for establishing vacuum conditions through the handle, a top sealing cover for the milk receptacle, and a bail pivoted at its ends to the cover and adapted to be swung upwardly to engage the handle and exert a downward thrust on the cover to hold the same closed.

8. In a mliking machine the combination of a milk receptacle provided with a rearwardly extending spout adapted to underlie the udder of a cow and open at its rear end below the top or the receptacle and on a plane at a substantial angle to the horizontal for the discharge of milk and having a sealing cap with a sight glass for sealing the open end of the spout, a pulsator mounted in fixed relation to the milk receptacle, a plurality of teat cups, flexible tube connections between the pulsator and the respective teat cups, flexible milk ducts establishing connection between the respective teat cups and the interior of the milk receptacle, and an exhaust pipe in communication with the pulsator.

9. In a milking machine, the combination of a milk receptacle provided with a rearwardly extending spout of length sufficient to underlie the udder of a cow while the milk receptacle underlies the belly of a cow, a pulsator mounted on the milking machine, a plurality of teat cups, flexible tube connections between the pulsator and the teat cups, flexible milk ducts establishing connection between the respective teat cups and the interior of the milk receptacle, and means for suspending the milk receptacle with its spout from the body of a cow at a point underlying the belly and with the spout underlying the udder, said suspending means being adapted to prevent down-tilting of the spout and longitudinal oscillation of the milk receptacle with relation to the suspending means while allowing the teat cups to fit vertically onto the teats while hanging normally in pendant position and without imposing any of the weight of the milk receptacle and spout on the teat cups, said suspending means including a forked flexible surcingle adapted to arch over the back of a cow, a frame having its ends secured to the depending forked ends of the surcingle whereby the forked ends hold the frame against swinging in one direction, one end of the frame being pivoted on one end of the surcingle and the other end of the frame being releasably secured to the other end of the surcingle, and longitudinally spaced hook devices for removably engaging the milk receptacle to the frame.

10. In a milking machine, the combination of a milk receptacle provided with a rearwardly extending spout of length sufficient to underlie the udder of a cow while the milk receptacle underlies the belly of a cow, a pulsator mounted on the milking machine, a plurality of teat cups, flexible tube connections between the pulsator and the teat cups, flexible milk ducts establishing connection between the respective teat cups and the interior of the milk receptacle, and means for suspending the milk receptacle with its spout from the body of a cow at a point underlying the belly and with the spout underlying the udder, said suspending means being adapted to prevent down-tilting of the spout and longitudinal oscillation of the milk receptacle with relation to the suspending means while allowing the teat cups to fit vertically onto the teats while hanging normally in pendant position and without imposing any of the weight of the milk receptacle and spout on the teat cups, said suspending means including a longitudinally extending arched handle having down-turned ends secured to the milk receptacle, a forked flexible surcingle adapted to be arched over the back of a cow, longitudinally spaced frame rods having their ends engaged by the depending forked ends of the surcingle whereby the forked ends hold the frame against swinging in one direction, one end of the frame being pivoted on one end of the surcingle and the other end of the frame being releasably secured to the other end of the surcingle, and longitudinally separated hook devices adapted to engage the frame rods for removably suspending the milk receptacle.

11. Milk apparatus comprising a milk receiving receptacle having an emptying spout extending from the body thereof and terminating in an emptying opening at a substantial angle to a horizontal plane when the receptacle is in its normal milking position and the bottom of the opening being substantially below the top of the receptacle, releasable closure means for the opening and a plurality of teat cup milk-hose-receiving openings in the spout adjacent to but spaced from the opening, said closure means including a sight glass, and said milk-hose-receiving openings being located in positions near the sight glass so that streams of milk flowing therefrom into the spout are visible through the sight glass.

HERBERT A. McARTHUR.
JOHN B. DECKER.

REFERENCES CITED

The following references are of record in the file of this patent:

UNITED STATES PATENTS

| Number | Name | Date |
|---|---|---|
| 473,770 | Murchland | Apr. 26, 1892 |
| 583,165 | Bender | May 25, 1897 |
| 636,446 | Norby | Nov. 7, 1899 |
| 925,196 | Klein | June 15, 1909 |
| 1,045,991 | Lindstrom | Dec. 3, 1912 |
| 1,185,203 | Jordan | May 30, 1916 |
| 1,653,756 | Babson | Dec. 27, 1927 |
| 1,859,213 | McCornack | May 17, 1932 |
| 2,340,297 | Schmitt et al. | Feb. 1, 1944 |
| 2,460,856 | Stanke et al. | Feb. 8, 1949 |

FOREIGN PATENTS

| Number | Country | Date |
|---|---|---|
| 31,634 | Sweden | Oct. 7, 1911 |
| 26,063 | Great Britain | of 1913 |